US012670244B2

(12) United States Patent
Davidson

(10) Patent No.: US 12,670,244 B2
(45) Date of Patent: Jun. 30, 2026

(54) FIREWELL SYSTEM FOR HUMAN INTERFACE DEVICES

(71) Applicant: Bit Brain, LLC

(72) Inventor: Brian Keith Davidson, New York, NY (US)

( * ) Notice: Subject to any disclaimer, the term of this patent is extended or adjusted under 35 U.S.C. 154(b) by 0 days.

(21) Appl. No.: 18/381,044

(22) Filed: Oct. 17, 2023

(65) Prior Publication Data

US 2024/0126869 A1    Apr. 18, 2024

Related U.S. Application Data

(60) Provisional application No. 63/416,792, filed on Oct. 17, 2022.

(51) Int. Cl.
| | |
|---|---|
| *G06F 21/54* | (2013.01) |
| *G06F 21/55* | (2013.01) |
| *G06F 21/60* | (2013.01) |

(52) U.S. Cl.
CPC ............ *G06F 21/54* (2013.01); *G06F 21/552* (2013.01); *G06F 21/602* (2013.01)

(58) Field of Classification Search
CPC ...... G06F 21/54; G06F 21/552; G06F 21/602; G06F 21/566; G06F 21/56; G06F 21/554; G06F 2221/034; H04L 63/1416; H04L 63/1441; H04L 63/20; H04L 63/1425
See application file for complete search history.

(56) References Cited

U.S. PATENT DOCUMENTS

| | | | | |
|---|---|---|---|---|
| 9,921,975 B2* | 3/2018 | Katoh | ................... | G06F 21/31 |
| 11,520,939 B2* | 12/2022 | Beitler | ................... | G06F 21/85 |
| 2016/0099963 A1* | 4/2016 | Mahaffey | .............. | H04L 63/166 |
| | | | | 726/25 |
| 2016/0328159 A1* | 11/2016 | Coddington | ........ | H04L 63/1408 |
| 2018/0324179 A1* | 11/2018 | Hou | ........................ | G06F 21/51 |
| 2020/0372168 A1* | 11/2020 | Stow | .................... | G06F 21/602 |
| 2024/0007491 A1* | 1/2024 | Spurlock | .............. | G06F 21/554 |
| 2024/0064163 A1* | 2/2024 | Jilani | ................... | G06F 16/258 |

\* cited by examiner

*Primary Examiner* — Wasika Nipa
*Assistant Examiner* — Edgar W Xie
(74) *Attorney, Agent, or Firm* — The Rapacke Law Group, P.A.

(57) ABSTRACT

A system for providing a human interface device firewall (HID-F) is disclosed, including a device detector to detect the presence of a human interface device and to turn on a human interface device firewall if a human interface device is detected. An interceptor intercepts one or more inputs and transmit the one or more inputs to a malicious input engine configured to analyze the one or more inputs for malicious input. If the input is deemed safe the one or more inputs are sent to a host operating system for processing. An encrypted data store receives and stores the one or more inputs from the malicious input engine. An enforcer receives the one or more inputs if they are deemed malicious and shuts down the one or more malicious inputs such that they are not sent to the host operating system. The HID-F also has advanced optional features such as: support multiple payload analyses, optional enforcement options, historical payload analysis, and complex meta rules bases on analyses results.

20 Claims, 3 Drawing Sheets

MALICIOUS INPUT ENGINE (MIE) COMPONENTS

ENFORCER COMPONENT

FIREWELL SYSTEM FOR HUMAN INTERFACE DEVICES

CROSS-REFERENCE TO RELATED APPLICATIONS

The present application claims priority to U.S. Provisional Application No. 63/416,792 filed Oct. 17, 2022, titled "HUMAN INTERFACE DEVICE FIREWALL" which is hereby incorporated by reference in its entirety.

TECHNICAL FIELD

The embodiments generally relate to human interfaces devices and, more particularly, to security systems to protect the host from malicious human interface device input.

BACKGROUND

Analyzing current BadUSB defense classes builds up a set of conditions that solutions must comprehensively address. These defense classes are hardware, device fingerprinting, machine typing detection, user interaction, and detecting malicious processes. Even though these defenses are flawed, cybersecurity professionals should consider utilizing them together as part of a defense-in-depth. Hardware-based defenses have grown less compelling in modern times.

Supply chain disruptions brought upon by just-in-time shipping result in additional complexity in maintaining the compute inventory for a business. Adding a new component to each device adds to the supply chain disruption risk. A delay in a hardware component's production for defending against BadUSB would cause a delay in the entire computer's delivery for a worker needing it. Anyone can modify the hardware with physical access. For instance, repairing a glued USB port or replacing an in-between physical verification device is feasible.

Auditing and verifying that hardware is installed and running in a remote or hybrid working environment is more challenging. Additionally, deploying hardware devices into already provisioned laptops and desktops is more logistically difficult in the remote or hybrid working environment.

BeamGun (Lospinoso, 2022) is a perfect example of why device fingerprinting is not an acceptable solution. A BadUSB device can imitate an approved (Dijkhuizen, 2018) USB device to bypass BeamGun. This strategy defeats any fingerprinting defense.

Fingerprinting can be considered as a single mathematical function f(x)=y, that takes in fingerprint data, x, and produces a Boolean result. A true result of y indicates that the fingerprinted device of x is in set A (allowed), while a false result indicates that the device is in set B (blocked). The data, x, used to obtain a fingerprint is electrical signals transmitted via the USB port. In the case of more complex fingerprinting, a more complex categorization might be utilized—but logically, it would reduce to the same mapping of allowed or blocked.

To defeat fingerprinting, the BadUSB can transmit the same x as f(x)=y, which results in a true Boolean result, indicating that the device is in set A. BeamGun is bypassed in this manner. Since distinguishing devices is defeatable, this research assumes that the BadUSB device is indistinguishable from a USB keyboard.

Other defenses attempt to tell if a machine is "typing" (Kyle Denney, 2019). This attempt is a practical step. It will identify commands a human did not send out with extremely high reliability. For instance, it might detect inhuman typing speed with nearly 100% certainty. This is defeated by the USB Rubber Ducky released by Hak5 in 2022, which can add random delays to defeat typing speed detection methods.

Machine Learning models that analyze the content for detecting human versus BadUSB input have a fundamental logical flaw in their application. A USB device that uses multiple ports to split its input would defeat the analysis pinned to that port.

Should the model account for multiple ports, the attacker can be a human in order to bypass this more sophisticated approach. The WiFi-HID (Bongiorni, 2017) is precisely that. If an attacker can be a human and send a specific input, then an automated BadUSB attack merely has to defeat the ML algorithm by imitating human input.

This Human Interface Device Firewall assumes BadUSB "typing" is indistinguishable from human being "typing" for the discussed reasons. It is a worst-case scenario, and we should expect attackers to engage in their best offense—the defender's worst case.

One of the more intriguing thoughts is to require human interface device interaction to 'authenticate' a human interface device to the computer. For instance, the USBCheckln (F. Griscioli, 2016) requires the BadUSB to 'type' in a code before connecting to the laptop. This scheme seems secure since the BadUSB device cannot physically "see" the prompt of what to type and typically does not have a way to input a specified code.

Bypassing USBCheckln is easy by having human input before proceeding with its program, such as with the Wi-FI HID or Wifiduck. Given existing technology, it would be straightforward to automate the interaction by utilizing optical character recognition on displayed text with a camera and automatically inputting it before proceeding.

The only user interaction that would initially seem sufficient is the same user interaction deemed adequate to authenticate to that computer and any attached networking environments (e.g., a VPN). For instance, password login with biometric MFA seems sufficient. However, it is not. An authentic user could grab a BadUSB on purpose, authenticate, and then the payload executes. User Interaction is not sufficient to stop the payload in what is already a common social engineering attack vector.

While a BadUSB attack is occurring, it will run malicious processes. Programs such as Windows Defender might detect downloaded or generated artifacts or even identify malicious processes in memory. The downside of these defenses is that the attacker has them too. Attackers can experiment until their payload is not detected before launching their attack. This experimentation is a routine tactic that happens today to bypass defensive software.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments described herein relate to a system for providing a human interface device firewall, including a device detector to detect the presence of a human interface device and to turn on a human interface device firewall if a human interface device is detected. An interceptor intercepts one or more inputs and transmits the one or more inputs to a malicious input engine configured to analyze one or more inputs for malicious input. An encrypted data store receives and stores the one or more inputs from the malicious input engine. An enforcer receives one or more inputs and analysis results from the MIE. It then decides what action to take. Actions can include shutting down one or more malicious inputs that are not sent to the host operating system, alerting to an external system, blocking the input, forcing an authentication mechanism, or forwarding the data to the operating system.

The Human Interface Device Firewall (HID-F) will make the BadUSB attack far more challenging to succeed while avoiding privacy intrusion by using machine learning models paired with encryption. Analysis of current BadUSB defenses' flaws will develop a series of design principles that the HID-F must follow to avoid the same pitfalls. These design principles, validated by research code, show that the HID-F is a feasible new class of defensive cybersecurity applications.

In one aspect, the HID-F is auditable for its functioning and its presence.

In one aspect, the HID-F categorizes one or more outputs from the malicious input engine.

In one aspect, the HID-F processes one or more rules into a configured action or a hardcoded action. The configured action or the hardcoded action includes at least one of the following: disconnecting the human interface device, seeking additional authorization, transmitting an alert, ignoring the configured action or the hardcoded action, or blocking the configured action or the hardcoded action.

In one aspect, the HID-F comprises one or more Meta Rules, wherein the HID-F ranks the Meta Rules in order of precedence or severity.

In one aspect, the HID-F is configured to decide an action when the action is derived from rules using the Meta Rules.

In one aspect, via the HID-F, an analysis is generated to alert the appearance of an unwanted or otherwise specified payload on a keyboard.

In one aspect, an analysis is generated via the HID-F to detect encoded or cryptographically transformed data.

In one aspect, the HID-F transforms cryptographically encoded data into an intermediate decoded form or a final decoded form.

In one aspect, the HID-F utilizes pattern matching on payloads.

In one aspect, the HID-F runs an analysis on the source of the payload to further analyze meta-information on the payload.

In one aspect, the HID-F analyzer analyzes the payload's embedded data.

In one aspect, the HID-F controls the data retention and the encryption of a plurality of stored data to limit access to the plurality of stored data to only the human interface device.

In one aspect, the HID-F is configured to selectively override the encryption of the plurality of stored data to provide a replay of the payload.

In one aspect, the HID-F is configured to limit the replay of the payload via the restriction of queries of the replay to meet one or more predefined or non-predefined criteria.

In one aspect, the HID-F stores one or more plaintext credentials or representations of credentials and is configured to erase one or more plaintext credentials or credential representations from the data store.

In one aspect, the HID-F back tests one or more new rules to the data store up to a limit of retained data.

In one aspect, the HID-F causes the user to authenticate when the HID-F enforcer acts.

In one aspect, the HID-F simulates an oracle with an intelligent modeled mode of thought, an artificially intelligent modeled mode of thought, or a mathematically modeled mode of thought as an analysis engine.

In one aspect, the HID-F transmits one or more rules for remote analysis, wherein one or more results are returned to the HID-F.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
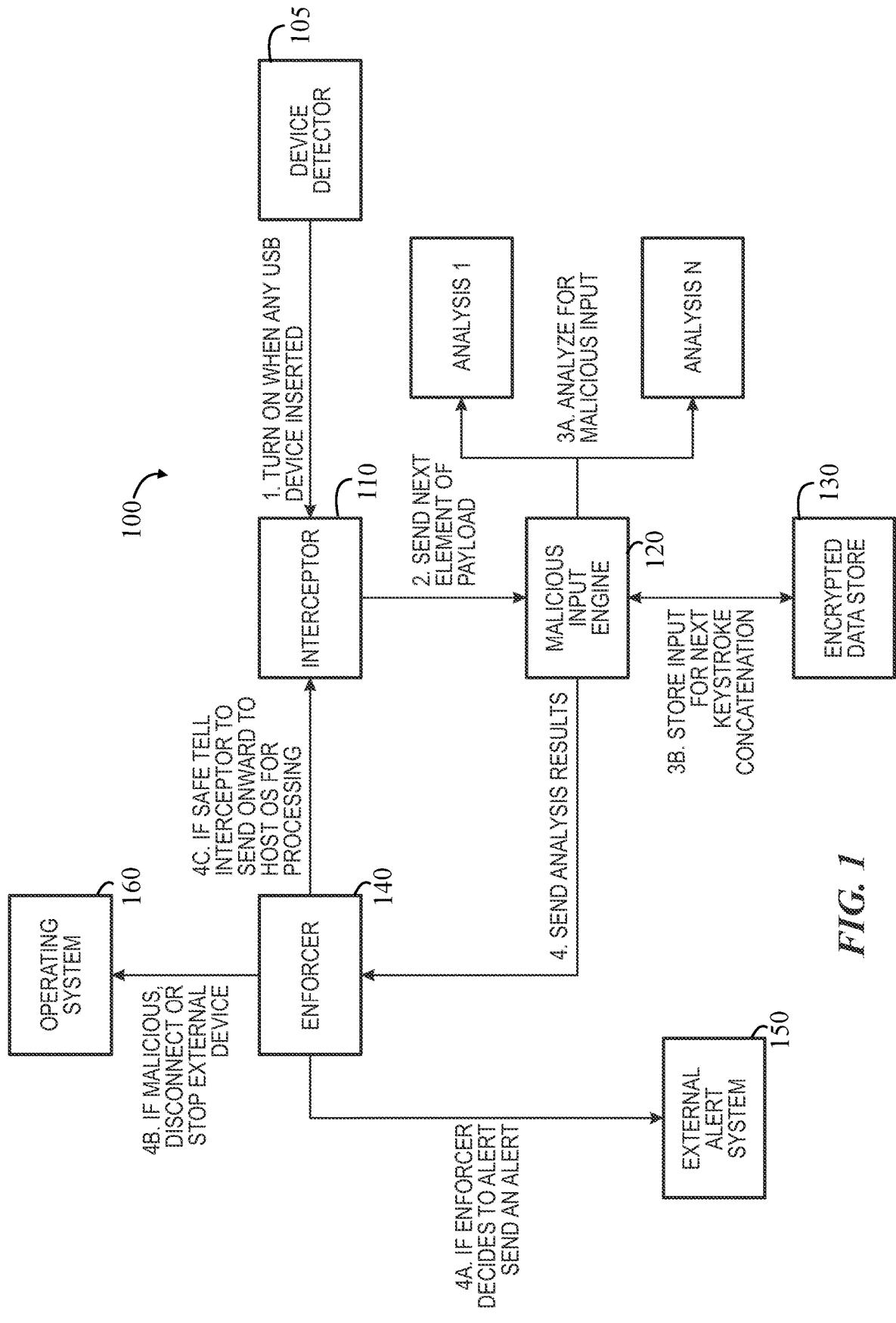
FIG. 1 illustrates a block diagram of a human interface device firewall system, according to some embodiments.

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this disclosure, the various embodiments may be a system, method, and/or computer program product at any possible technical detail level of integration. A computer program product can include, among other things, a computer-readable storage medium having computer-readable program instructions thereon for causing a processor to carry out aspects of the present disclosure.

In general, the embodiments provided herein relate to a Human Interface Device Firewall (HID-F), which is an endpoint-based software application that protects the host from malicious human interface device (HID) input. Each HID has its unique input. The mouse has mouse events. The keyboard has keystrokes. In the present application, the example of keystrokes are utilized. However, the same concepts discussed here would apply to other HID input forms.

As used herein, the terms "malicious" and "malicious human interface device input" may be defined as input that the administrator or owner of the computer does not want executed or as harmful or undesirable input. A sample of examples of common malicious input are ransomware, crypto mining malware, data theft, installing disallowed programs, and reverse shells.

In some embodiments, the firewall may monitor for key phrases (e.g., a codename) and alert when a user is typing in the key phrases. The firewall may monitor for password use that a user should not know. While specific monitored elements may not be harmful, they may be defined as undesirable.

The payload is analyzed for sensitive data, encoding, cryptographic material, the context of the application and/or user, patterns in the data through pattern matching, and embedded referred payloads. Analysis can include human or human-like oracles being posed a series of questions.

As used herein, the term "oracle" may be used to define a large language model (LLM), or human beings would be examples of such an oracle. When queried with the payload (s) and a set of questions, the oracle returns whether any of the questions are true or false. For this purpose, questions about categorization can be reduced to true and false questions. Payloads sent to the oracle can be made of multiple payloads or even a combination of prior triggered rules and the current payload The HID-F attaches rules to each analysis type or subtype for each payload. Some rules are then categorized as groups of rules, also known as "Meta Rules."

The HID-F has firewall rules as well; these are referred to as "action catalog" or "action catalog entry," each of which has various actions or action outcomes tied to them. Analysis rules are then linked to zero or more action outcomes, such as blocking input, disconnecting the device or other enforcement actions, alerting, ignoring, or requiring authorization; multiple actions outcomes are given precedence through meta-rules, alternatively ordinally ranked rules for precedence, or ranking actions in precedence order. These action outcomes can be considered "firewall rules" for human interface devices.

The HID-F Datastore can be configured to retain as little data as possible to limit privacy liability. Some users of the HID-F may have various degrees of acceptance of how much data they want to retain for legal, technical, ethical, moral, or other reasons.

The HID-F can have an additional embodiment for back-testing new rules or 'analysis rules' against its' data store. This is important to avoid creating overarching rules that would disrupt the users of a HID-F. For instance, a new rule could be back-tested to see if it would cause false positives or false negatives analysis rules. This embodiment would only return the results, not the payload, over one or many HID-F deployments.

The HID-F data store can be configured to remove sensitive keywords, credentials, and passwords. It retains a list of such data in its Credential Guard sub-component of the data store. It then deletes that payload after the analysis is complete.

The HID-F can expose its data store in limited circumstances through a Replay mechanism. Each data store stores a minimally acceptable query constraint. This limits the queries to meet the criteria to prevent overarching data queries. While the criteria can be set to be restrictive, some organizations may make the minimally acceptable query to be anything. This aims to enable organizations that want to restrict the data queries, for instance, for legal or compliance reasons.

The HID-F system should be executed on the same hardware as the operating system. For instance, if a human did all the calculations for running an operating system, the same human should be running the HID-F. If a 2nd human was running the HID-F and he was not able to compute, then the other human could continue running the operating system; this is often called "failing open." Similarly, a hardware peripheral device, separate from the host running the operating system, was running this software; it could be unplugged.

There may be additional remote components for the malicious input engine, but they cannot be relied upon for the execution of the main firewall logic of the HID-F. For instance, a remote large language model might be consulted, and if it does not respond promptly, the enforcer would be unable to block the input it was analyzing. A tardy response from a remote analysis could also trigger enforcement action, but it would not have the highest guarantee of preventing damage by blocking the input from being entered.

The guarantee of having an embodiment, as described in [0059](the prior block), is that it is auditable by querying running processes. Thus, we know the HID-F is operating as expected. This is important for ensuring the system's security posture when running a HID-F. Without being "auditable" as described above, the HID-F might be bypassed, and the auditing guarantees would be of diminished utility.

When the MIE detects a rule violation, it sends the rule ID and associated metadata to the enforcer as part of its results.

When the enforcer obtains a rule ID from the malicious input engine, it has to decide to do one or more of the following: alert, enforce, block, authenticate, or let it pass. The rule ID may come in even after the payload was let through in some circumstances, which would be late alerting or enforcement.

Each rule ID would have metadata and be matched against a set of constraints configured in the Enforcer's action catalog. Each entry of the action catalog describes what to do when that rule is triggered.

Rule IDs can also be categorized with a synthetic rule ID, called a category. That category could then be used as an ID in the action catalog, just like any other rule ID. These categories act as "groups of rules" and can also be composed of different categories.

Each action catalog entry has the following information: a rule or category ID, matching criteria, and the action to take. Matching criteria would check against the metadata and use logical operators such as AND, NOT, OR, LESS THAN, CONTAINS, GREATER THAN, EQUALS, INTERSECT, and similar operators. The action to take would be "ignore" (let it through), "enforce," "block," "authenticate," or "alert." Alerting actions may have additional metadata to indicate where to alert, how to alert, or alter the characteristics of the alert. Block in this scenario would not let the keystrokes pass.

Metadata is sent with a rule to the enforcer. Metadata includes the context of the rule's runtime state, such as the user ID, network information, domain information, and any other useful context that would help fine-tune the actions to take.

If enforcer rule analysis is not utilized, the Enforcer can only choose to act or not act. The presence of a rule violation would be the only differentiator without the context of the action catalog analyzing the rule violations with the associated context. The actions can be blocked, enforced, or alerted. Not acting means the operating system can process the payload.

FIG. 1 illustrates a block diagram of the Human Interface Device Firewall (HID-F) 100. The HID-F operates by first detecting, via a device detector 105, whether it should be on (i.e. if a USB device is inserted). An interceptor 110 intercepts keystrokes (or other input) received. Keystrokes are then sent to a malicious input engine 120, which analyzes the keystrokes for malicious input. This is done by one or more analyses of each keystroke in the context of other recent keystrokes. An encrypted data store 130 stores input for the next keystroke concatenation. The keystroke is forwarded to the host operating system by the interceptor if the keystroke is analyzed and deemed safe. If the keystroked is analyzed and deemed malicious, an enforcer 140 shuts down HID (i.e., keyboard or similar devices) input/output.

The device detector 105 is responsible for the on and off state of the entire HID-F 100. When an HID is connected, it turns the HID-F 100 on; when it is not connected, it turns it off. Registering with the host OS will notify the HID-F 100 of these events. The device detector can be defaulted to always leave the HID-F on.

On startup, an HID-F 100 needs to know if any external HID is already connected to the machine. If none are detected, the Firewall will not need to run and will not register keystrokes. Alternatively, the HID-F can be configured to work with keyboards that are physically integrated with the computer, such as a laptop keyboard. This would require leaving the HID-F on by default.

An HID may connect to the computer while the HID-F 100 is running. At that point, the device detector 105 should be notified to start the Interceptor. This notification will trigger further post-processing and analysis of the keystrokes.

The device detector 105 could also be configured to assume an HID is connected. This option would permit analysis for malicious input of integrated keyboards such as a laptop keyboard.

The Interceptor 110 takes keystrokes from the OS or directly as a device driver before any other program can receive the keystroke. It then releases the keystroke back to the OS when the Malicious Input Engine 120 tells the Interceptor that the keystroke is safe.

It is advisable to avoid writing a device driver for the Interceptor 110 since that is error-prone and fragile code. Writing device drivers for this scenario are akin to creating a pencil around a pencil to look at what a pencil is drawing. Working at the interaction between pencil and paper (or HID and operating system) is more reliable. Utilizing Operating System calls will avoid the entire class of errors from writing device drivers.

Sometimes, users will type in passwords or other credentials. These should not be stored in plaintext, even in RAM, that would make the HID-F 100 a glorified keylogger. The Interceptor 110 should use stream encryption for every keystroke. Block encryption would involve buffering the plaintext in RAM until a block is ready, which is insufficient for designing a stream-based event processor such as an HID-F 100. Block encryption could be used for each keystroke, but it would be done in a streaming manner and thus be an inefficient (and likely insecure) simulacrum of this approach.

Before encrypting data, it should be normalized to its closest ASCII representation. Some programming or scripting environments will take Unicode characters and auto-convert them to their closest ASCII representation. Without normalizing the data, attackers could use Unicode to evade analysis. The Malicious Input Engine 120 should be tuned to analyze the normalized input. The original keystroke should also be saved for processing at the end of the data flow. Optionally, some Malicious Input Engine 120 analyses may utilize the original keystroke data when deemed useful for blocking malicious input. In the above scenario, Unicode can be used as a placeholder for a more complex form of input that can be reduced to a simpler form. The simpler form of input in the above example is ASCII, but that is a placeholder for any other simpler form of input of a more complex form of input, such as Unicode. If the data is not normalized when encrypted and stored, it will need to be normalized many times during analysis. The raw form should also be stored.

The Malicious Input Engine 120 (MIE) determines whether the incoming keystrokes are malicious. The system has 13 milliseconds to complete the analysis. Otherwise, a human user could detect input lag (Potter, 2014). Various analyses are performed in parallel to meet the 13 milliseconds latency requirement while still determining whether the keystroke is malicious.

Analyses to perform include: Cryptoanalysis determines if the input is a ciphertext or otherwise encoded data. Machine Learning Models determine if the payload represents an attack. Signature matching checks to see if the payload is banned. Sandbox analysis could be included in limited circumstances. Keyword analysis would check against prohibited keywords. Sensitive keyword representation analysis would store hashes of keywords and compare the hashes of the payload; this way, the sensitive keywords are never exposed. Meta-rule analysis inspects the other analyses, past analyses, and its analyses recursively to determine if a more complex malicious input has occurred with the payload. Regular Expression Analysis, also known as Regex Analysis, uses regular expressions to find more complex patterns in the payload that represent malicious behavior. Application analyses create a context of the environment, such as running processes, that can be combined with metarules. Source analysis provides context of where the payload came from, such as clipboard, keyboard, over-the-network, or otherwise. The source analysis results are meant for use with meta-rules. Human-like analysis poses a series of questions to a simulated human acting as an "oracle" such as "Is the payload an attempt to hack a computer?" which is then used either as a regular rule or information to be incorporated into Meta Rules.

Sandbox analysis involves forwarding the input to another device to attempt execution. A remote analysis would typically not meet the 13 milliseconds turn-around and would not be ideal for this system. Local analysis in a container could meet the 13 milliseconds turn-around, but this adds the risk of container escape. Sandbox analysis could help analyze commands that are downloaded via typed-in commands.

The encrypted data store 130 takes the encrypted data stream and transforms it into a ciphertext ready for data processing. The constant append operation on the encrypted data store means it must maintain two parts of the ciphertext in memory: the aged ciphertext and the dynamic ciphertext. The dynamic ciphertext is re-encrypted until it forms a complete block and is then moved to the end of the aged ciphertext.

The data store should also normalize data as a background process. Normalization preserves the intended keystrokes for processing while removing the keystrokes that the computer won't process. For instance, a payload of 200 megabytes of keystrokes being entered and then deleted would evade a straightforward analysis since non-normalized deleted text would be incorrectly analyzed. To normalize, in this scenario, replace the aged text with a normalized aged text that removes deleted text. Subsequent analysis of keystrokes is conducted on the normalized aged text. The non-normalized data can also be stored for other analyses; it may sometimes be compressed to avoid arbitrarily long payloads.

The data model is responsible for mapping the dataset context to block context-switching evasions. Switching scope to a temporary application, such as notepad.exe, and then back to a command shell would also be accounted for in the encrypted data store 130. In this scenario, it will need to know the context of the currently focused window and maintain different data sets for each focused window. It would need to forward the focused window's data set when analysis occurs.

The context will need to normalize for other evasions, such as using the clipboard or analyzing the contents of a file that could be loaded into memory from a command. A robust data model will make evading the HID-F 100 more difficult.

The Enforcer 140 prevents the attack by acting before the entered keystroke is sent from a malicious payload. Many enforcement options exist depending on the host OS's capabilities and user preference. The enter keystroke can be replaced by other input indicating a command has been entered, such as a mouse click on a program's "execute" button or a voice command that says "execute" and is interpreted as a command to utilize the payload.

The most robust option for the Enforcer is to shut down the connection to the HID that sent the malicious input. A shutdown must also block the enter key or other input(s) that cause execution. This would involve calling the Host OS system functions or writing a device driver. Writing a device driver opens new vulnerabilities and is not advised.

Another strong option is to lock the OS. Locking is a well-supported and straightforward operation. In Windows, it is the most reliable enforcement action and thus should always succeed. For instance, by design, the BlockInput function is bypassed by control-alt-delete (Microsoft, 2021). Control-alt-delete is then followed by alt-k to lock a Windows host OS.

The components of the HID-F 100 follow these design principles to maintain active users and value to the business. Design principle 1—Encryption of all user keystrokes. Leaked credentials or intellectual property will result in the HID-F being flagged as a vulnerable application.

Design principle 2—The HID-F 100 may not interfere with the user's typing activities. Additionally, the latency of each keystroke being processed must be kept to less than 13 milliseconds to achieve this goal.

Design principle3—Authentic HID devices must function as expected. For example, USB devices should remain functional. Therefore, device drivers for the HID-F 100 should be avoided since they are complex software to maintain as universally interoperable with authentic USB devices.

Design principle 4—Prevent malicious payloads from executing. Here is the primary purpose of the HID-F 100. Without it, the software is essentially nonfunctional. A more relaxed view of accepting late information and making the best effort to interrupt execution can be incorporated into this principle, but only as a supplement to the main objective of complete execution prevention.

Figure 2:
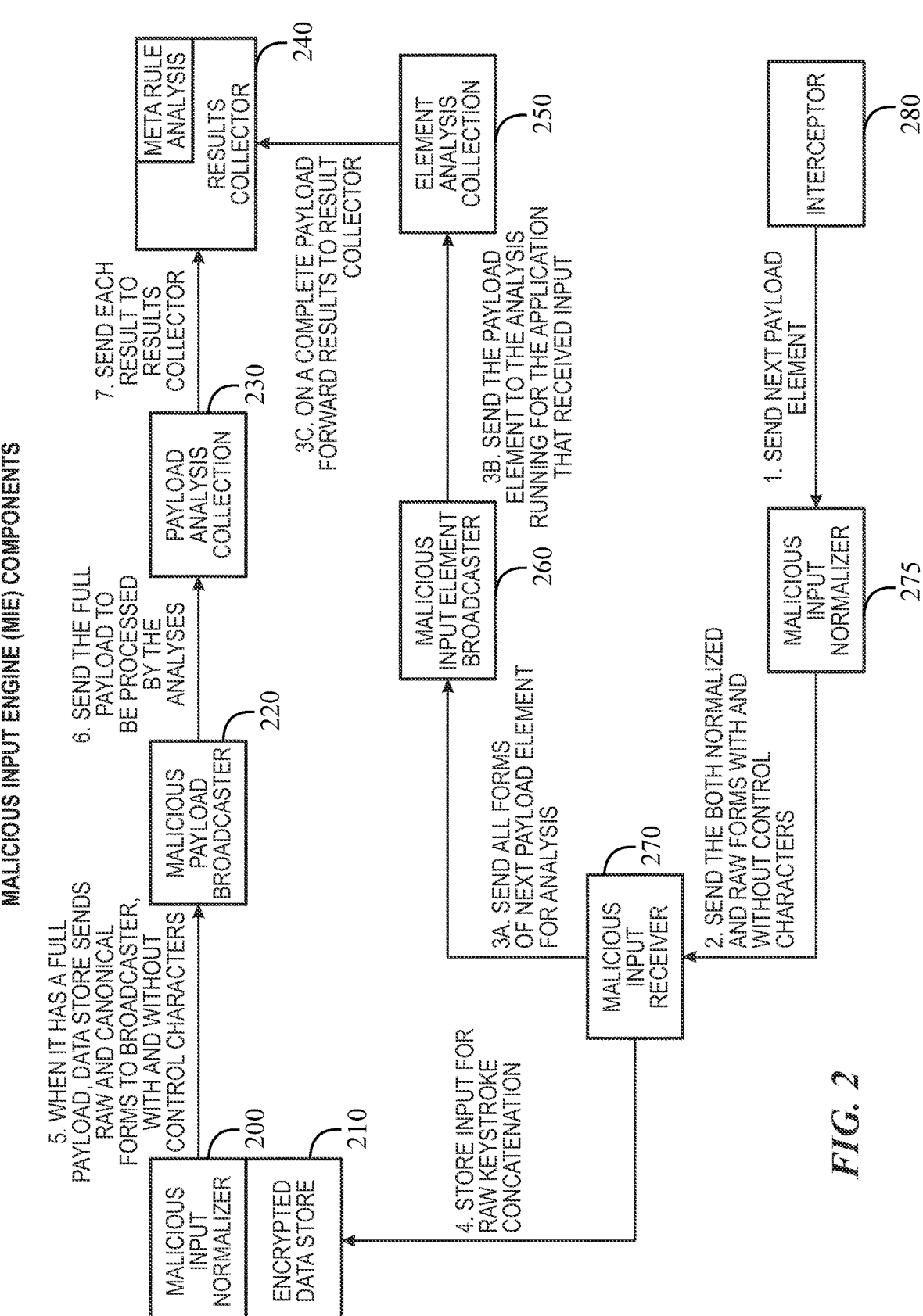
FIG. 2 illustrates a block diagram of the malicious input engine (MIE) components, according to some embodiments.

FIG. 2 illustrates a block diagram of the malicious input engine (MIE) components, which includes a malicious input normalizer 200, encrypted data store 210, malicious payload broadcaster 220, payload analysis collection 230, results collector 240, element analysis collection 250, malicious input element broadcaster 260, malicious input receiver 270, malicious input normalizer 275, and interceptor 280.

Figure 3:
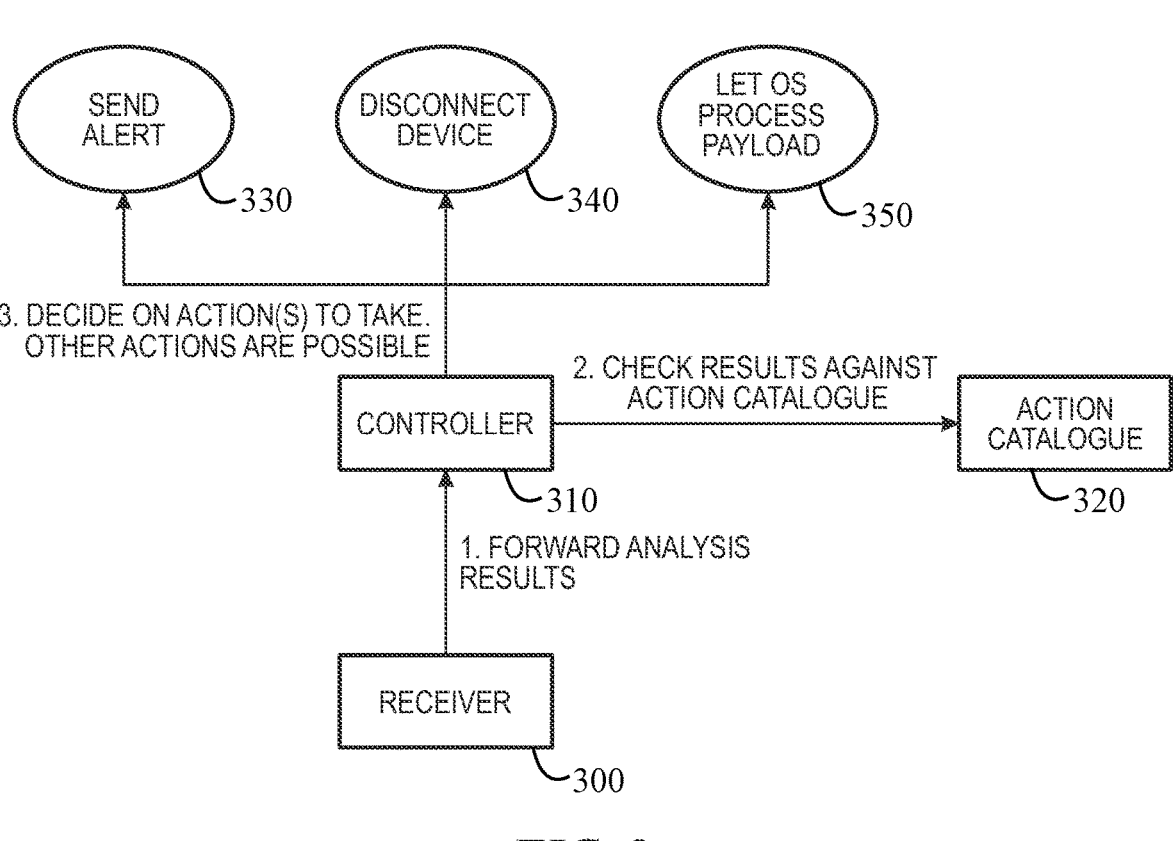
FIG. 3 illustrates a block diagram of the enforcer component, according to some embodiments.

In some embodiments, The Malicious Input Engine (MIE) with meta-rules takes in payload elements and returns a collection of results from all meta-rules for further processing. FIG. 2 shows how the MIE processes the input and then outputs rule ID results. FIG. 3 shows how the enforcer processes the rule ID results.

In FIG. 2, the payload is normalized and then split into normalized and raw forms. The input receiver broadcasts each payload element to analyses that work on the payload as it is built from elements. It also sends the elements into a data store.

When the datastore 210 has a full payload composed of multiple elements, it normalizes and saves the entire payload. The data store 210 then broadcasts the payload to analyses that operate on a full payload.

Rule IDs are key data returned by each analysis component. If Rule IDs are not used, the analysis component can only signal a pass/fail as a Boolean value.

Every engine component may optionally return rule ID's. This is useful for meta-analysis or for the Enforcer to decide what to do on a rule failure. Rule IDs may return additional information depending on the rule, such as a length, field, confidence rating, the application it was entered on, the username or user ID of the user entering the payload, the roles & permissions of the user, other user or network meta-data (such as domain), or additional information specific to that rule. System rule IDs also indicate hard-coded rules particular to an analysis engine.

Keyword Analysis

The keyword analysis takes every keystroke up and compares the input against predefined plaintext keywords. The keywords may be encrypted, but this would slow down the analysis as each is decrypted for analysis.

A hash-based approach is preferred rather than using plaintext or decrypting the data. A hash-based approach uses an algorithm to transform the data into a "representation." Comparing to a hash, it provides speed and confidentiality of the keywords.

The keyword analysis would store a collection of these keywords, or keyword representations, with optional IDs for the Enforcer. One example is: "hello", 52. Hello is the keyword, and 52 is the optional ID.

When the HID-F sends input to the keyword analysis, it will check whether it is in the keyword collection. On a failure, it returns the failure and, optionally, the ID.

Each keyword has an allow list of who is allowed to use it. A disallow list can be used instead or in addition to an allow list.

Sensitive Keyword Representation Analysis

Sensitive keywords are passwords, secret project names, bank account numbers, or other related intellectual property. This analysis is suited for finding such sensitive keywords in a payload. A keyword representation is obtained by taking input, for instance, from a keyboard and then applying an algorithm, such as a hashing algorithm, to transform it into a new representation. For instance, the word "hello," when run through the md5 algorithm, would produce "5d41402abc4b2a76b9719d911017c592" as a representation. Each keyword has an allowlist of users who can use the keyword. Inversely, a disallow list can be used instead or in addition to an allow list.

A collection of these representations, with the algorithm (e.g., md5), would be stored by the Keyword representation analysis with optional IDs for the Enforcer. One example is: "5d41402abc4b2a76b9719d911017c592", md5,52

The elements analyzed are the representation, the algorithm, and the rule id. When the HID-F sends input to the keyword representation analysis, it will apply all transformation algorithms (e.g., md5) to the input and then check to see if it is in the keyword representation collection. On a failure, it returns the fail and, optionally, the ID. Since the length of the match is unknown, many transformations must be generated from the same payload. This has performance challenges since this is quadratic relative to the input size, also known as $O^2$ in complexity analysis.

To make this computable, only faster encryption algorithms such as TwoFish should be utilized for all entries. If optimized, the keyword representation analysis would be more rapid.

Also, the max and minimum length of the keywords' raw form should be known beforehand to avoid extraneous computation.

Human-Like Analysis

A simulated human acting as an "oracle" could decide whether the analyzed payload warrants an alarm or enforcement action. The same effect can be achieved by handing the payload to a model that simulates aspects of human decision-making, such as a large language model. For instance, a large language model could be asked: "Consider the payload <PAYLOAD_GOES_HERE>being entered into a computer. Provide a yes or no answer to the following questions:

1. Is the payload an attempt to hack the computer?
2. Does the payload attempt to steal information from the computer?
3. Does the payload harm the computer's software, data, or other computers on the same network?"

These are example questions. The questions posed to an oracle for a HID-F would involve queries about the payload and its' effect on the computer.

If the answer to the oracle's questions is yes, whether a large language model or otherwise simulated human, then the Malicious Input Engine would return a result indicating malicious input. Each question, or the totality of questions, would optionally have a rule ID attached to it.

Sometimes, the human-like analysis may be run outside of the computer. In that case, the answer may come back too late to take immediate action, but the enforcer could act late.

Meta Rules Analysis

The meta-rules analysis inspects a combination of malicious payloads rather than a single malicious payload. The combination of malicious payloads provides a stronger signal for deciding whether to alert (via the external alert system 150) or enforce, helping reduce false positives and false negatives. This analysis also allows for payloads amongst multiple programs to be analyzed together.

Utilizing meta-rules analysis requires rule IDs to be used by the HID-F. It listens to all rule violations, the program the rule triggered on, and a measure of global monotonically increasing ordinality of the input, such as how many executions worthy events (such as hitting enter or clicking 'go' in a program) have occurred.

Think of the execution worth events count as a line number, but in all the books you have ever read. Your 100th line might be in a different book than the 101st line, but the 102nd line might be in the same book as the 100th. Replace books with programs and lines with payloads to bring the same concept to the HID-F. The exact measure of an execution worth event depends on how an application defines a payload. This can vary depending on the program analyzed; for instance, a graphical user interface that uses mouse clicks on specific buttons would differ from a command prompt when defining payloads.

The meta-rule analysis would contain a set of rules, each a "rule about rules." For example, the meta-rule analysis may have rule #5, which only triggers when rule's #1, #2, and #3 all trigger on adjacent lines defined in rule #5. Rules 1 to 3 would come from different analysis engines in the MIE. The adjacency metric input is defined as the ordinality of the payload that triggered the rules, as described in a few paragraphs above. The adjacency metric would be compared to the rule's predefined adjacency count, such as less than, greater to, equal, or some more complex combination of the previous comparisons.

A meta-rule can also incorporate other meta-rules since meta-rules are just rules unto themselves. Each meta-rule has a defined criteria for adjacency of each rule violation to each other or the most recent payload. A meta rule would have two adjacency metrics for each rule: a "start" and "end" that define an interval that another specific rule ID should appear. The meta rule would have a list of such intervals matching rule IDs, each element would be called a Meta Rule Criteria. Each Meta Rule Criteria can then be combined in the list with logical operators such as AND, NOT, OR, XOR and similar operators.

The Meta Rule Criteria can be more specific to include the programs the caused a rule to be violated, or other meta information such as username, user role, computer network information, etc.

For example, Meta rule #10 might look like: Meta rule criteria 1: notepad.exe's contents violate rule #11 with relative adjacency –5 to 0 and Meta rule criteria 2: cmd.exe's contents violate rule #12 with relative adjacency of 0 to 0, with corporate user roles on the corporate home network In order to process all the rules coming from the MIE, the Meta Rules Analysis would be part of the results collector that gathers all rules from the other MIE Analyses.

Crypto Analysis

The crypto analysis engine inspects the payload for data exhibiting the following characteristics, each of which has their own rule id:

High entropy detects payloads with high entropy indicating encryption.

Start position of character in payload

End position of character in payload

Length of data exhibiting high entropy

Data representation—checks to see if the data is represented in something other than plaintext Format describes the representation of the data such as hexadecimal, binary, base64, or some other representation.

Start position

End position

Length of data exhibiting high entropy

For a data-representation trigger, an additional analysis may also occur, depending on the HID-F configuration and composition. The data will be normalized into plaintext, potentially going through multiple passes of normalization from one data representation to the next, and then the entire de-normalized payload will be ran through the malicious input engine again. Also, each normalized payload will be ran on its own independently. Through the malicious input engine again. Each layer of normalization is tracked, and only a certain depth of normalization will be allowed before a special system rule triggers that stops further normalization. It is up to the configuration of the HID-F to decide to alert or enforce that system rule. For encrypted data, the HID-F may try to decrypt it for further analysis. The options are to decrypt it immediately, but make the user wait or to let it through and decrypt it later. Decrypting it later, might risk the payload being nefarious and executing before a rule is sent to the enforcer.

Regex Analysis

Regex analysis runs regular expressions against the payload. This is done in: the original format of the data, such as Unicode, and the canonical form of data where the same letter in different fonts is normalized into letters that can be run against a canonical regular expression. Additionally control characters are optionally stripped from the data, to normalize it further. In some application contexts, control characters may be analyzed with regular expressions if it is meaningful to that application.

The regex analysis will have 2 sets of rules, one for canonical regular expressions, and another for non-canonical expressions. Most users will utilize canonical. Each rule has a rule ID and gets metadata on the ordinality of the occurrence, the start position of the matching text, and the end position of the matching text.

For safety reasons, the HID-F may have a timeout configuration for regex analysis where it has a few options depending on the HID-F configuration:

1. Keep running, and don't time out at all when running a regular expression. This is vulnerable to a denial of service attack on a regex to bypass the HID-F.
2. Time out after a specific time period and send a hard coded time out rule id. If the HID-F is configured to accept the rule id, a malicious payload may be accepted by the enforcer.
3. Time out, and let the rule ID go, but run the full analysis in the background. The malicious payload might be let through and get stopped too late.

To prevent time outs, restricting the regular expression syntax to avoid non-performant meta-characters will avoid the timeout issue completely. This would ban regular expressions such as look-ahead and look-behind which has more than one step of analysis for each additional element of the payload. Instead, those rules should be rewritten to not have meta-characters to avoid the pitfalls of timeouts.

Without look behind and look ahead meta-characters, each payload can be processed one character at a time until the payload is completely entered into the human input device. The regular expression would never need to jump ahead or behind to different positions of the payload and thus it would not timeout.

Regular expressions can be made to process input from any human interface device by using symbolic representation. Thus, a regular expression analysis is not strictly limited to text data.

Application Analysis

The application analysis ignores the payload completely. Instead, it observes the meta-information about the user and the program being typed into. The application analysis has a block list mode and an allow list mode. The allow-list mode is a set of rules that say what users can type into what programs. When an application is not on the user's allow list and the user sends it a payload, the rule ID for that program's entry is triggered in the MIE.

The block-list mode is a set of rules that says what applications are blocked, and for which users. When an application on the block list is triggered for a user by sending a payload into it, that rule's associated ID is triggered in the MIE.

Users can be defined by groups, roles, attributes, or other aggregations as supported by the operating system 160 and its associated running programs.

Both the user list and application can have logical operators such as AND, OR, NOT, CONTAINS, INTERSECT, etc to make more complex rules for the allow list and the block list.

Source analysis indicates the source(s) of the payload. For instance, the payload might come from a clipboard, a file, a keyboard, or some other combination. Meta rules could make use of this to fine-tune what they detect. For instance, a developer copying hexadecimal code into a programming environment might be a rule that indicates the payload should be accepted. The payload itself may refer to an "embedded payload" from a variable, clipboard, file contents, or other data. That embedded payload may then be reanalyzed with metainformation either in combination with the original payload, together with the original payload and other embedded payloads from the original payload, or independently. The decision to run that analysis depends on the composition of how the HID-F is constructed by an engineer or configured for deployment on a system.

Data Store

Storing sensitive user data can cross legal boundaries such as health and privacy concerns. The concerns would be around confidentiality. To ensure privacy both encryption, access, and retention must be addressed. The Data Store's privacy guard oversees encrypting the data, holding the only encryption key for its data, and deleting the data after its configured retention period. The data lifecycle is:

1. Each line is stream ciphered into an encrypted payload entry as it is entered.
2. Each line is then block encrypted into a new entry of the data collection for that application, with a time stamp, user information, and user metadata of the person typing the data.
3. When queried for the line by the malicious input engine (MIE), it decrypts the line and provides it in one, some, or all of the following formats: raw payload, raw payload without control characters, canonical form without control characters, or canonical form with control characters. It can also be subscribed to and automatically give lines to the MIE as the payload is completed.
4. After the configured retention period, the line is deleted from the Data Store.

The privacy guard only provides data to the Malicious Input Engine and has no API or access for outside entities for its raw data. If it were, that would be a key logger which this invention is not.

Credential Guard

To avoid passwords from being stored in the Data Store, each payload must be checked to see if a password was part of that payload. If any passwords are detected in a payload, that payload is then deleted from the Data Store after it undergoes analysis by the MIE.

To make this work, all known passwords must be provided to Credential Guard, which will then one-way transform them into a password representation. The algorithm should be one of the faster cryptography algorithms since many potential password representations will be generated from user payload to check against credential guard's database of password representations. A slower cryptogram algorithm would make the HID-F unacceptably slow when checking for password representation matches.

As the Data Store processes each line, Credential Guard creates password representations for all permutations between a configured minimum and maximum payload size, and then checks each one against the Credential Guard store. On a match, the Data Store deleted the line from its memory.

The Credential Guard offers eventual consistency since the processing of password representations may not always be achievable in real-time. Multiple methods exist to feed Credential Guard the sensitive passwords. Those consist of a dump of passwords from a password manager, a manual entry process, or remote dumps from system administrators. Password representations can be directly entered as an alternative to avoid providing sensitive credentials in their raw form. The Credential Guard can also get new credentials and re-run them against the Data Store if a credential wasn't originally present.

Whenever the Credential Guard checks a data store entry, it marks it as "last checked" with a specific time stamp or other sequential marker. This last checked marker is used when replay queries occur to ensure that the credential guard has scanned that payload before offering it for replay.

Back Testing

New rules from the MIE may cause false positive alerts. To see if a rule would commonly be positive, each HID-F can be back-tested. A set of rules would be sent to each HID-F. The HID-F would create a Test-MIE with just that specific set of rules and have the Data Store replay all of its data against the Test-MIE.

In this case, the Enforcer would be replaced by a Recorder, which transcribes all rule IDs it receives from the Test-MIE and then reports it back to the sender of the new rules. Back Testing can also be used to check if a known attack vector has occurred anywhere else on a group of HID-F's (or singular HID-F) before it was previously known. Back Testing can only go back as far as the data retention configured on the Data Store.

Replay

For Incident Response, it is useful to see the payload around an attack. The ability to get this data must be weighed against privacy concerns. The replay ability allows fine-tuned searching of the payloads to exactly the incident, to avoid over-reaching the collected data.

The HID-F's Query Engine supports Data Store queries with the following mandatory parameters:

Start time—only query data inclusively or exclusively after this time

End time—only query data inclusively or exclusively before this time

List of Rule IDs—all of these rules must have been triggered in this time frame

User IDs—the list of user(s) that must have triggered the rules

Filter: Application—the specific application to return data from, each one must be listed Filter: Other metadata such as network information, user information, etc.

Other combinations or forms of these mandatory parameters may exist. Similar information would be needed to perform queries, and less information would reduce the range of information that can be queried.

Optional parameters should be:

A list of regex's for excluding results

A list of UserIDs to exclude from the results

A list of applications to exclude from the results

Other optional parameters can be created to further fine tune results, or not be used for less specific results.

Based on the risk tolerance of the organization the data store query criteria must be predefined and stored in the Data Store's query engine. Any query going forward must meet those criteria. Updates to criteria should only apply to future payloads in the data store, but some HID-F implementations may choose to ignore this at the cost of some privacy guards.

The data store query criteria are:

Maximum time length between start and end time to prevent overly broad queries.

The number of rule ID matches that must be hit for a query to return results. This brings certainty to the data.

Maximum number of results, which should be the aggregation of results across an enterprise and fine tuned by system administrators. If the number is too small, then it isn't a useful criterion, and if the number is too big then an overly broad query can be constructed. Insider Risk professionals should be consulted to determine the correct number and associated tradeoffs.

A HID-F query engine can also throttle queries that repeat the same or similar list of rule ID's but with different times to prevent fishing expeditions. This is optional.

When the data store query criteria are entered into the Data Store, all payloads are marked with the query criteria ID. Only queries meeting that criteria may obtain that specific payload through replay.

The replay utilizes the back testing mode. Using the MIE's Meta Rule Analysis, replay uses a meta rule that matches the query, but with start and end time stamp as an additional meta data criterion. Whenever the Recorder from Back Testing finds a match of the query's meta rule in the time frame, it outputs all the payloads, and payload application destinations from that time frame. The output might be to a log, a database, or some other alternative medium.

Authenticate Action Enforcer

The enforcer can force authentication. There are varieties of authenticate whose descriptions follow. Each successful authenticate silences the offending rule for a configurable period, and optionally alerts. Multiple authentication methods may be required as an action.

System-lock: locks the system and requires a password to continue. On unlocking the payload is let through.

MFA: force a multi factor authentication.

Bio-lock: Require a face scan, iris scan, or fingerprint to authenticate.

Voice-lock: Require a voice recognition to authenticate. Other varieties of authentication may be invented and added to the authenticate action. The authentication action can be used by people with high trust who are critical to business operations. They may be more technical and cause false positive rules to trigger. Also, some technology professionals may need this depending on what they do.

FIG. 3 illustrates a block diagram of the enforcer component including a receiver 300, controller 310, action catalogue 320, send alert 330, disconnect device 340, and payload processing 350. The receiver forwards analysis results to the controller 310. Results are checked against the action catalogue 320 and the controller decides on actions to take including the send alert 330 action, disconnect device 340 action, and let OS process payload (payload processing 350) actions.

All analyses are received by the results collector, which then forwards it on to the Receiver component of the enforcer in FIG. 3.

The Enforcer Controller analyzes the result set and utilizes the Action Catalog to determine which action to take.

As described hereinabove, the system may be utilized for HID-F monitoring for input payloads from interface devices such as keyboards, mice, voice, etc. While doing so, the computer is used as normal for day-to-day activities such as running programs, using internet browsers, and other tasks commonly associated with utilizing a computer. The HID-F may never actually be triggered, but behind the scenes it is analyzing each interaction with the computer to determine if the interaction is malicious. At any point, the user may trigger the HID-F to act either through malicious input, or alternatively a BadUSB device (or similar device). When this happens, the user may encounter one of several outcomes: Nothing at all, something may happen in the background unknown to the user. Or enforcement, such as locking the computer, blocking the keyboard from entering the input, forced authentication, or something else that interrupts the normal use of the computer.

When a malicious payload reaches the enforcer, it may issue an alert. An alert can be transmitted directly through a file or integrated into a system that accepts alert. Regardless of the mechanism of alerting, those who receive alerts will see an alert from the HID-F detailing the nature of the alert, and information about where it is coming from.

In some embodiments, rules are configured by the administrator of the HID-F. During keyword analysis processes, the administrator of the HID-F would enter a collection of keywords that are banned into the HID-F. If meta-rules are used, then each keyword is assigned a rule.

In some embodiments, sensitive keyword representation analysis may be utilized. At times, administrators only have the keyword representation and algorithm to calculate that representation. When this occurs, they make a list of these representations, the algorithm for each representation, and a way to describe (such as a user list, or role list) who is allowed, or not allowed to use these sensitive keywords.

During human-like analysis processes, administrators may ask new questions, with the caveat that the human-like oracle may need further evaluation to see if it is properly trained to answer the question. With meta rules, each rule will get its own ID.

During regular expression analysis, a system administrator can add to the regular expression analysis by providing either canonical or non-canonical regular expressions to describe patterns of input. These can have rule IDs with meta rule mode.

In some embodiments, Meta Rules must be specifically enabled by the administrator of the HID-F. To create a Meta Rule, a user must identify the other rules, or Meta Rules that the user wishes to use. Then, logical operators previously defined in this patent under Meta rules, are utilized to combine the rules into a Boolean (yes/no) response. A meta rule can use other meta rules. Meta rules also can use an adjacency operator to indicate the ordinality of one rule to another in combination with the logical operators, it likely will be used so. The meta rule allows for complex conditions to be used by the HID-F for analysis.

In some embodiments, the data store is configured by the administrator of the HID-F and may be encrypted or not encrypted.

In some embodiments, a data retention period can be configured so that the privacy guard deletes older data, to maintain privacy.

In some embodiments a credential guard is permitted to monitor for and delete from the data store. This may be accomplished by hashing passwords when provided to the credential guard, or by providing the password representation and algorithm to generate the password.

In some embodiments, back testing is permitted by either system administrators or others granted this privilege (who are called back testing analysts). Back testing involves the back testing analyst creating a new rule, as described in this patent. Then that rule is remotely run against each HID-F. Each HID-F will receive the new rule and run it against its history in the data retention period of each data store. The results are treated as pseudo-alerts that are aggregated into a final report for the back testing analyst.

Back testing is permitted by either system administrators or others granted this privilege. These people are called replay analysts. Typically, these are incident response professionals. Replay is done through the HID-F of a replay analysts. The HID-F that is configured so is a HID-F replay client. The HID-F replay client will accept a query as described in the replay analysis section of this patent. The query is then remotely run against each HID-F just like a back-test but with a query instead. The results of the query are aggregated and tabulated into a response that the analyst receives in the HID-F replay client.

In some embodiments, the action catalogue is permitted to be used by either system administrators or others granted this privilege. These people are called HID-F analysts. The HID-F analyst can modify the action catalogue and add entries through the HID-F. When granted the HID-F analyst privilege, they now have a special version of the HID-F available to them call the HID-F Action Catalogue Rules Client. Through the Client, action catalogue entries can be created, read, deleted, and/or updated. The Action Catalogue entries are described elsewhere in this patent. Some analysts may have a restricted subset permitted to them by a System Administrator. Changing the action catalogue will result in all HID-Fs in the business to receive the changes and process them accordingly in the future.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

REFERENCES

Afzali et al. (2021). Economic uncertainty and corruption: Evidence from public and private firms. Journal of Financial Stability Volume 57.

Al-Zarouni, M. (2006). The Reality of Risks from Consented use of USB Devices. 4th Australian Information Secuirtyu Management Conference. Perth, Western Australia, Bongiorni, L. (2017, May 1). WHID Injector: How to Bring:HID Attacks to the Next Level. Retrieved from Security Affairs: https://securityaffairs.colwordpress/58587/hacking/whid-injector-bring-hid-attacks.html Dijkhuizen, N. v. (2018), Keynterceptor: Press any key to continue, HITBSecConf. Amsterdam.

F. Griscioli, M. P. (2016). USBCheckin: Preventing BadUSB Attacks by. 14th Annual Conference on Privacy, Security and Trust, (pp. 493-496).

Frey, S. (2018). How to Eliminate the Prevailing Ignorance and Complacency Around Cybersecurity. in M. a. Bartsch, Cybersecurity Best Practices (pp. 1-10), Springer.

Gatlan, S. (2022, January 7). FBI: Hackers use BadUSB to target defense firms with ransomware. Retrieved from Bleeping Computer: https://www.bleepingcomputer.cominews/securitylfbi-hackers-use-badusb-to-target-defense-firms-with-ransomwarel Hak5. (2022, June), usbrubberducky-payloads. Retrieved from GitHub: https://github.comlhak5/usbrubber-ducky-payloads Hoelzer, D. (2021, October 9). Applying Machine Learning to Network Anomalies. Retrieved from Youtube: https://youtu.be/PdddO1-jeQQ Kyle Denney, E. E. (2019). USB-Watch: A Dynamic Hardware-Assisted USB Threat Detection Framework. In Security and Privacy in Communication Networks (Vol. 304).

Lospinoso, J. (2022, June 11). Beam Gun, Retrieved from Github: https://github.com/JLospinoso/beamgun Microsoft. (2018, March 30). KeyboardProc callback function. Retrieved from MSDN: https://docs.microsoft.comlen-us/previous-versionslwindowsldesktopflegacy/ms644984(v=vs.85)

Microsoft. (2018, March 30). MSDN, Retrieved from KeyboardProc callback function: https://docs.microsoft.comlen-uslprevious-versions/windowsldesktop/legacy/ms644984(v=vs.85)

Microsoft. (2021, October 13). BlockInput function (winuser.h). Retrieved from MSDN: https://docs.microsoft.com/en-us/windows/win32/api/winuser/nf-winuser-blockinput Microsoft. (2021, March 28). https://docs.microsoft.com/en-us/windows/win32/inputdev/using-raw-input. Retrieved from MSDN: haps://docs.microsoft.com/en-us/windows/win32/inputdev/using-raw-input Microsoft. (2021, January 7). MSDN, Retrieved from using Hooks: https://docs.microsoft.com/en-us/windows/win32/winmsg/using-hooks Microsoft. (2021, January 4). Registering for device notification. Retrieved from MSDN: https://docs.microsoft.com/en-us/windows/win32/devio/registering-for-device-notification Microsoft. (2022, May 20). GetRawInputDeviceList function (winuser.h). Retrieved from MSDN: haps://docs.microsoft.com/en-us/windows/win32/api/winuser/nf-winuser-getrawinputdevicelist Microsoft. (2022, June 12). Windows Drivers Samples—devcon. Retrieved from Github: https://github.com/microsoft/Windows-driver-samples/blob/main/setup/devcon/cmds.cpp

What is claimed is:

1. A system for providing a human interface device firewall (HID-F), comprising:

a device detector module configured to register with an operating system for raw input notifications and, responsive to detection of a human interface device (HID), transition the HID-F to an active state;

an interceptor module configured to intercept individual HID inputs via operating system raw input registration before the inputs are delivered to an application program and to provide the intercepted inputs to a malicious input engine;

a data store configured to maintain the inputs in memory as an aged input history and a dynamic input buffer, the dynamic input buffer accumulating inputs until a predetermined block size or threshold is reached and the accumulated inputs being appended to the aged input history;

the malicious input engine configured to analyze the inputs for malicious patterns using the aged input history and a per-window normalized input context that accounts for deleted text and active window focus, and configured to complete analysis within a predetermined latency threshold selected to prevent perceptible input lag, for example about 13 milliseconds, and, when the inputs are deemed safe, to permit the inputs to be processed by the host operating system; and an enforcer module configured, when the malicious input engine determines that the inputs are malicious, to receive the inputs and to shut down the malicious inputs before they are executed by the host operating system.

2. The system of claim 1, wherein the HID-F is auditable for its functioning and its presence, wherein a payload is normalized into a canonical, a raw form, or both, for analysis.

3. The system of claim 1, wherein the HID-F categorizes the one or more outputs from the malicious input engine.

4. The system of claim 3, wherein the HID-F processes one or more rules into a configured action or a hardcoded action, wherein the configured action or the hardcoded action included at least one of the following: disconnecting the human interface device, seeking additional authorization, transmitting an alert, ignoring the configured action or the hardcoded action, or blocking the configured action or the hardcoded action.

5. The system of claim 4, wherein the HID-F is further comprised of one or more Meta Rules, wherein the HID-F ranks the Meta Rules in order of precedence or order of severity.

6. The system of claim 5, wherein the HID-F is configured to decide an action when the action is derived from rules using the Meta Rules.

7. The system of claim 6, wherein an analysis is generated, via the HID-F, to alert the appearance of a specified payload on a keyboard.

8. The system of claim 7, wherein an analysis is generated, via the HID-F, to detect encoded or cryptographically transformed data.

9. The system of claim 8, wherein the HID-F transforms cryptographically encoded data into an intermediate decoded form or multiple transformation rounds into final decoded form.

10. The system of claim 9, wherein the HID-F utilizes pattern matching on payloads.

11. The system of claim 10, wherein the HID-F runs an analysis on the source the context, or both, of the payload to further analyze the meta-information on the payload.

12. The system of claim 11, wherein the HID-F runs an analysis on embedded data of the payload.

13. The system of claim 12, wherein the HID-F controls the data retention and the encryption of a plurality of stored data to prevent access to the plurality of stored data to only the human interface device.

14. The system of claim 13, wherein the HID-F is configured to selectively override the encryption of the plurality of stored data to provide a replay of the payload.

15. The system of claim 14, wherein the HID-F is configured to limit the replay of the payload via the restriction of queries of the replay to meet one or more predefined criteria or non-predefined criteria.

16. The system of claim 1, wherein the HID-F stores one or more plaintext credentials or one or more representations of the credentials and is configured to erase the one or more plaintext credentials or the one or more representations of credentials from the data store.

17. The system of claim 5, wherein the HID-F back tests one or more new rules to the data store up to a limit of retained data.

18. The system of claim 5, wherein the HID-F causes the user to authenticate when the HID-F enforcer takes action.

19. The system of claim 5, wherein the HID-F simulates an oracle with an intelligent modeled mode of thought, an artificially intelligent modeled mode of thought, or a mathematically modeled mode of thought as an analysis engine.

20. The system of claim 1, wherein the HID-F transmits one or more rules for remote analysis, wherein one or more results are returned to the HID-F.

\* \* \* \* \*